United States Patent Office

3,215,137
Patented Nov. 2, 1965

3,215,137
IMMOBILIZING BANDAGE AND METHOD
OF APPLICATION
Perttu V. Laakso, Tower Lakes, Barrington, Ill., assignor to The Kendall Company, Boston, Mass., a corporation of Massachusetts
No Drawing. Filed Aug. 3, 1960, Ser. No. 47,155
4 Claims. (Cl. 128—90)

This invention is concerned with immobilizing bandages of the type used for immobilizing fractured limbs and other body portions. Specifically this invention relates to plastic immobilizing bandages as contrasted to the usual plaster of Paris bandages.

In the past there have been many dissatisfactions with plaster of Paris bandages because of its heaviness, X-ray imperviousness, excessive moisture absorbability, rapid soiling, difficult cleaning, poor shock resistance, lack of elasticity, slowness in reaching ultimate strength, poor abrasion resistance and its receptivity to bacetrial and fungal growth.

Many attempts have been made to replace plaster of Paris as the immobilizing agent, particularly with plastic materials many of which, in the solid state have desirable properties which plaster of Paris lacks. Certain solvent systems involving cellulose plastics have been provided, but these immobilizing systems have been unacceptable to most orthopedists because of the toxicity and flammability of the solvents, emission of which persists for some hours. The problem of an improved replacement for plaster of paris, a cast material used for over 160 years, has remained unsolved therefore, with the result that orthopedic surgeons still prefer this material with all of its deficiencies as an immobilizing agent.

Superficially it might appear that a solution to the problem of producing a plastic immobilizing bandage could easily be found in the use of rapidly polymerizing materials. Monomers which may be retained in stable condition are well known. It is also well known how to initiate and control the time of polymerization of such monomers by the use of catalysts and accelerators which by their interaction form free radicals, the number of which determine the polymerization rate for a given quantity of a given monomer. It is an accepted theory that these free radicals initiate polymerization by attracting electrons from the monomer molecules thus making these molecules reactive with each other to form the polymer.

At any rate, it might appear that to form a satisfactory body cast, one need but apply sufficient wrappings of gauze saturated with monomer in which polymerization had been initiated and the time of polymerization had been preselected in the usual manner.

In practice, however, it soon became apparent that the problem is more complicated because of the fact that polymerization processes are strongly exothermic. Temperature is very important where body immobilizing bandages are concerned. The human body reacts in pain from prolonged contact with temperatures only 25° to 30° F. above body temperature. To prevent discomfort, therefore, immobilizing bandages should rise to temperatures not much in excess of 115° F. Comfortable temperatures are not attainable under ambient conditions with any undiluted monomer now available when it polymerizes withinan acceptable period and in sufficient amounts to provide the strength necessary for the usual immobilizing bandage. For a given monomer a very definite amount of heat proportional to the number of reactive sites is given off in converting a unit weight to polymer. If polymerization is completed rapidly, the heat is given off rapidly with attendant rapid rise in temperature.

The problem of providing a polymerizing bandage, therefore, appears to lie in providing a polymerizing system which will produce strong casts rapidly but without excessive temperature rise.

Inasmuch as the temperature rise is dependent upon the amount of a given monomer as well as the period of polymerization, it seems possible that one might substitute powdered polymer or other suitable filler for parts of the monomer thus reducing the temperature. The technique of mixing monomer with polymer is utilized in the dental plate manufacturing business but the temperatures of such mixtures which utilize considerable monomer are still much too high for body immobilization bandages. Obviously, in such a system, it is necessary to wet the polymer or other filler with the monomer if reasonable strength is to be obtained. But even monomer sufficient to wet the solids, gives off too much heat for body tolerance in the short immobilization period required for bandages. This situation suggests the possible use of liquid volatile and nonvolatile diluents to replace part of the monomer as liquid extender or wetting material.

Ordinary diluent liquids are completely unsatisfactory as extenders, however, because they form weak casts. This is true whether volatile low viscosity solvents which completely wet the solid filler, partially dissolve the polymer formed or not. Thus, both alcohol which is not compatible with the polymer formed and dimethyl formamide which is, form unsatisfactory casts whether due to poor cohesive strength or the formation of vapor cells or voids or to other causes, I do not know. Most nonvolatile viscous diluents, which generally have higher cohesive strengths and do not cause vapor cells, also form weak casts whether due to inadequate wetting of the solid filler or inability to dissolve the polymer formed or to other causes I do not know.

I have now discovered diluents which have higher cohesive strengths than most liquids but which, dissolved in the monomer, wet the solid filler and blend with the polymer formed in amounts necessary for satisfactory immobilizing bandages. These diluents have very high viscosities or may even be solids normally but their viscosities are very much reduced by small amounts of solvents including monomers. In other words, the diluents, when dissolved in monomeric solvents, form low viscosity solutions which extend the amount of liquid sufficiently to thoroughly wet the solid powdered filler. As the polymerization proceeds, these diluents being compatible with the polymer being formed act like plasticizers and form homogeneous solid blends with the polymer.

The use of these diluents with a suitably catalyzed and accelerated mixture of a monomeric solvent and a powdered polymer or other filler produces rapidly polymerizing strong casts having temperature increases within the limits of body toleration. I have found that various preferably nonporous finely divided fillers which do not inhibit polymerization may be substituted for powdered polymer either in whole or in part with comparable results or in some cases with only moderate reduction in strength. These more economical filled products are entirely suitable as immobilizing bandages. Comparative effects due to the filler are given in Table I hereinafter.

The diluent extenders which I have found to be unique in their action with monomeric solvents and the polymers thereof are the non-polymerizable polyalcohol esters which include very viscous liquids and solids. Representative of this class of compounds is pentaerythritol tetracetate but perhaps the best representatives are the sucrose esters such as sucrose acetate isobutyrate and sucrose octa acetate. The former sucrose ester which normally has a viscosity of 100,000 centipoises may be reduced in viscosity to 350 centipoises by the addition of only 20% polyethylene glycol dimethacrylate. Reduction in viscosity (although perhaps not so dramatic) with the addition of small percentages of less viscous liquid solvents is characteristic of the polyalcohol esters generally. In order to be properly effective as diluent extenders, however, such polyalcohol esters must be soluble in all proportions in the monomer selected and must form a continuous phase with the polymerized material formed.

The essential ingredients of the immobilizing bandages of this invention are a monomeric acrylic acid ester of a polyol, a polyalcohol ester extender soluble in said monomer and its polymer, a filler and a source of free radicals to initiate polymerization. The most satisfactory immobilizing bandages are those made from a suspension in which the monomer is in the range of 15 to 30% by weight, the extender is 20 to 35% by weight and the filler is 40 to 60%. Increasing the proportion of monomer and decreasing the proportion of extender with the filler constant tends to make the cast stronger and warmer and vice versa.

Suitable monomers for the purpose of this invention and those which I prefer are the esters of glycols or other polyalcohols such as the sucrose esters containing two or more methacrylate groups, preferred esters from the group being ethylene, diethylene, triethylene and polyethylene glycol dimethacrylate. A typical example of a high molecular weight (2074) monomer is sucrose dimethacrylate hexastearate.

Any system including any of the well-known catalyst-accelerator systems for the production of free radical initiators of polymerization may be used in bandages of this invention, but I prefer the peroxide catalyst-accelerator system. Both catalyst and accelerator should be stable at ambient temperatures. Of the preferred catalyst, peroxides with a half life of 15 hours or less in benzene at 70° C. are necessary to give reasonable immobilization or setting times. In this class are such peroxides as:

2,4-dichlorobenzoyl peroxide
Caprylyl peroxide
Lauroyl peroxide
Benzoyl peroxide
Acetyl peroxide Some mixed peroxides such as acetyl benzoyl peroxide are also suitable.

With regard to accelerators, those which I have found to be most suitable in such peroxide systems are the dimethyltoluidines and dimethylaniline with the former being preferred because of their less objectionable odor. However, the di-substituted aromatic amines of the formula:

where $\phi$ is an aromatic radical such as phenyl, tolyl or naphthyl and $R_1$ and $R_2$ are alkyl radicals and are generally satisfactory as accelerators in peroxide systems.

It is preferable that the fillers be non-porous because otherwise wetting the filler requires increased amounts of liquid. The fillers should also be inert in the sense that they should not inhibit polymerization. The preferred filler is starch and its derivatives, although dextrin and powdered polymers such as polyvinyl alcohol, polymethyl methacrylate and polyvinyl chloride are suitable. Where a soluble filler is used, it should not be used in a manner whereby a gel is formed with the monomer. Lightness and low cost are of course desirable attributes of all fillers and starch is preferred for these properties as well as for the fact that casts made with starch filler are about as strong as those made with expensive powdered polymers such as methyl methacrylate.

In preparing the bandages of this invention, a number of methods may be employed some of which are given below:

METHOD 1

A dipping solution is made of the monomer, the accelerator and most of the liquid extender. Gauze is coated by applying the filler, the catalyst, a small amount of extender and 1% to 5% of polymethyl methacrylate dissolved in methylene chloride. The body part to be immobilized is coated with petrolatum. The coated gauze is dipped into the dipping solution and immediately applied to the part by wrapping in overlapping spirals until sufficient thickness is secured.

METHOD 2

A dipping liquid suspension of all of the ingredients except the catalyst is made. The gauze is dipped into the liquid suspension and applied to the petrolatum coated body part to be immobilized. When the first layer has been wrapped, it is sprayed or coated with the catalyst and a second layer applied which is also coated or sprayed with catalyst. The cast is thus built up to proper thickness.

METHOD 3

Saturate gauze with catalyst. Make a paste of the other ingredients. Apply a layer of saturated gauze to a petrolatum coated body part and cover the gauze with paste. Wrap another layer of gauze and again apply paste. Continue until cast is of sufficient thickness.

METHOD 4

The catalyst and half of the other ingredients except the accelerator are used to saturate a doughnut shaped roll of stockinette. The accelerator and the other half of the ingredients except the catalyst are used to saturate a similar roll. The two rolls are separately sealed in foil-film packages. When they are to be used, the packages are opened and the stockinette rolls are stretched successively over the petrolatum coated limb and unrolled in alternate, catalyst containing and accelerator containing, layers.

METHOD 5

All of the ingredients except the catalyst are mixed and used to saturate the gauze. The catalyst is enclosed in an easily rupturable polyethylene-aluminum foil laminate envelope. The saturated gauze and the envelope are then enclosed in a heavier polyethylene envelope. When the cast is to be made, the inner catalyst containing envelope is ruptured without opening the outer envelope after which the gauze is kneaded to distribute the catalyst through it. The outer envelope is then opened and the saturated gauze is applied in proper thickness to the petrolatum coated limb.

Oxygen appears to be an inhibitor of polymerization of the products of this invention although the only effect of such inhibition is a very thin layer of unpolymerized monomer on the surface of the cast. This can be wiped from the surface readily but the effect can be completely eliminated by the incorporation of certain cobalt salts, which are used with an excess of catalyst about triple the usual amount. Bandages with such increased amounts of catalyst will polymerize into hard polymeric material in a period of about two minutes on an average. The preferred cobalt salt useful in the production of dry casts of this invention is cobalt octoate although the linoleate, naphthenate and tallate salts of cobalt also have a beneficial effect.

It is a fact that with a given casting material some variation exists in compressive strength of casts made, due to the presence of gauze, differences in penetration, winding, tightness and the like. In order to eliminate such differences in comparing the following typical examples with plaster of paris, compressive tests were made on cylinders cast entirely from cast material and measuring 1¼ inch in diameter and with a 13/16 inch bore. Such a cylinder cast of plaster of Paris had a compressive strength after 24 hours of 3.07 pounds per gram. It will be understood that the compressive strength of the typical formulae given below was measured on such a cylinder cast of the formula including the catalyst. In contrast to plaster of Paris which attains only about ⅓ of its compressive strength after one hour, the polymerized bandages of this invention attain 95% of their ultimate compressive strength within one hour.

*Example 1*

| | Parts by weight |
|---|---|
| Sucrose acetate isobutyrate (SAIB) | 25.0 |
| Polyethylene glycol dimethacrylate (MG-1) (302–390 ave. mol. wt.) | 25.0 |
| Starch | 50.0 |
| Dimethyl toluidine (DMT) | 1.0 |

This forms a dipping liquid into which gauze coated with about 10% of its weight of benzoyl peroxide may be dipped and wrapped onto a petrolatum coated limb. Plain gauze may be dipped into the liquid in accordance with Method 2 as an alternative. Method 4 may also be practiced with this formula by dividing the starch, SAIB and MG-1 into two equal liquids and adding the DMT to one and .3 part by weight of benzoyl peroxide to the other to form the dipping liquids.

The casting material had a compressive strength of 5.7 pounds per gram.

A comparison of the effects of various fillers may be made from the following table:

TABLE I.—BASIC FORMULA

| | Parts by weight |
|---|---|
| MG-1 | 25.0 |
| SAIB 90 | 25.0 |
| Dextrin | 25.0 |
| Additional filler* | 25.0 |

Benzoyl peroxide (catalyst as indicated).
Dimethyl toluidine (accelerator as indicated).

* See the following table:

| Additional filler | Catalyst | Accelerator | Compressive strength, lbs./g. | Heat evolution |
|---|---|---|---|---|
| Dextrin | .5 | .5 | 3.84 | Mild. |
| Polyvinyl alcohol | .5 | .5 | 5.25 to 5.68 | Do. |
| Polymerized MG-1 | .5 | .5 | 4.08 | Do. |
| Methyl methacrylate | .5 | .5 | 5.07 | Do. |
| Polyvinyl chloride (Geon 404) | .15 | .5 | 3.68 | Do. |
| Polyvinyl chloride acetate copolymer (Vinylite VAGA) | .15 | .5 | 5.00 | Do. |
| Phenolic resin (Amberol ST137) | .15 | .5 | 2.86 | Do. |
| Styrene butadiene resin (Pliolite S-5) | .15 | .5 | 4.76 | Do. |
| Polyester resins: | | | | |
| Hetron 92 | .5 | .5 | 9.64 | Hot. |
| Hetron 19 | .5 | .5 | 5.22 | Mild. |

The hetron resins above caused some irritation of the skin when used in concentrations as high as approximately ¼ of the total weight due perhaps to the presence of unreacted monomer therein but their use in reduced amounts particularly when a minimum of the resin monomer remains unreacted is contemplated.

*Example 2*

| | Parts by weight |
|---|---|
| SAIB | 25.0 |
| Sucrose dimethacrylate | 12.5 |
| MG-1 | 12.5 |
| Starch | 50.0 |
| DMT | 1.0 |

Catalyst—benzoyl peroxide .3 part by weight. Compressive strength 3.32 lbs./g.

*Example 3*

| | Parts by weight |
|---|---|
| MG-1 | 17.5 |
| Sucrose dimethacrylate | 12.5 |
| SAIB | 20.0 |
| Starch | 50.0 |
| DMT | 1.0 |

Catalyst—benzoyl peroxide .35 part by weight. Compressive strength 3.5 lbs./g.

*Example 4*

| | Parts by weight |
|---|---|
| Ethylene glycol dimethacrylate | 25.0 |
| SAIB | 25.0 |
| Starch | 50.0 |
| DMT | .6 |

Catalyst—benzoyl peroxide .3 part by weight. Compressive strength 3.19 lbs./g.

*Example 5*

| | Parts by weight |
|---|---|
| MG-1 | 25.0 |
| Sucrose octa acetate | 25.0 |
| Starch | 50.0 |
| DMT | 2.0 |

Catalyst—benzoyl peroxide .3 part by weight. Compressive strength 3.67 lbs./g.

*Example 6*

| | Parts by weight |
|---|---|
| MG-1 | 25.0 |
| Sucrose dimethacrylate | 25.0 |
| Starch | 50.0 |
| DMT | .7 |

Catalyst—benzoyl peroxide .3 part by weight. Compressive strength 4.20 lbs./g.

To any of the above examples from .03 to .5 part by weight of the cobalt salts previously mentioned may be added, it being necessary at the same time to triple the amount of catalyst.

I claim:

1. A composition suitable for use in preparing an immobilizing bandage comprising a suspension including a monomer selected from the group consisting of ethylene glycol dimethacrylate, polyethylene glycol dimethacrylates and sucrose dimethacrylate hexastearate, an accelerator, a viscous liquid extender rapidly thinned by said monomer chosen from the group consisting of pentaerythritol tetracetate, sucrose acetate isobutyrate and sucrose octa acetate forming a liquid solution therewith and a solid blend with the polymer thereof and a finely divided filler wetted by said monomer-extender solution, said suspension having present therein about 15 to 30% of said monomer, about 20 to 35% of said extender and about 40 to 60% of said filler by weight, said suspension being capable of solidification to form a strong tough cast within 2 to 15 minutes and at cast temperatures not more than 118° F. by mixture with a catalyst rapidly decomposed by said accelerator freeing radicals initiating polymerization of said monomer.

2. A method of immobilizing a body part comprising impregnating a fibrous carrier with a temporarily moldable suspension including a monomer selected from the group consisting of ethylene glycol dimethacrylate, polyethylene glycol dimethacrylates and sucrose dimethacrylate hexastearate, an accelerator, a catalyst rapidly decomposed by said accelerator freeing radicals initiating polymerization of said monomer, a viscous-liquid extender rapidly thinned by said monomer chosen from the group consisting of pentaerythritol tetracetate, sucrose acetate isobutyrate and sucrose octa acetate forming a liquid solution therewith and a solid blend with the polymer thereof, and a finely divided filler wettable by said monomer-extender solution, said monomer, extender and filler having proportions by weight of about 15 to 30% monomer, 20 to 35% extender and 40 to 60% filler, applying said impregnated fibrous carrier to the body part whereby said monomer polymerizes within 2 to 15 minutes with the liberation of heat insufficient to raise the temperature of the bandage in excess of 118° F.

3. A liquid comprising a blend of about 15 to 30 parts by weight of a monomer selected from the group consisting of ethylene glycol dimethacrylate, polyethylene glycol dimethacrylates and sucrose dimethacrylate hexastearate, about 20 to 35 parts by weight of a viscous liquid extender having the property of being rapidly thinned by said monomer and chosen from the group consisting of pentaerythritol tetracetate, isobutyrate and sucrose octa acetate forming a liquid solution with said monomer and a solid blend with the polymer thereof, and an accelerator having the property of rapidly decomposing a suitable catalyst to free radicals, said liquid being suitable for forming a tough strong immobilizing cast within 2 to 15 minutes with a cast temperature not exceeding 118° F. when mixed with a suitable catalyst and about 40 to 60 parts by weight of a finely divided filler wettable by said liquid and applied to an aimal body portion.

4. A coated sheet including a fabric coated with a mixture comprising a viscous liquid chosen from the group consisting of pentaerythritol tetracetate, sucrose acetate isobutyrate and sucrose octa acetate, a finely divided filler wettable by a solution of said viscous liquid in a suitable monomer and a catalyst having the property of being rapidly decomposed by a proper accelerator freeing radicals capable of initiating polymerization in a suitable monomer, a second solution including a proper accelerator and a suitable monomer selected from the group consisting of ethylene glycol dimethacrylate, polyethylene glycol dimethacrylates and sucrose dimethacrylate hexastearate, said coated sheet when wetted with said second solution and applied to a portion of an animal body forming a strong tough cast within 2 to 15 minutes with a cast temperature not in excess of 118° F., the proportion of ingredients other than fabric in said sheet when wetted being about 15 to 30 parts by weight of said monomer, about 20 to 35 parts by weight of said viscous liquid and about 40 to 60 parts of said filler.

References Cited by the Examiner

UNITED STATES PATENTS

| | | | |
|---|---|---|---|
| 2,161,481 | 6/39 | Marks | 260—29.6 |
| 2,218,710 | 10/40 | Herrmann | 128—90 |
| 2,338,976 | 1/44 | Pollack | 260—17.4 |
| 2,492,203 | 12/49 | Treadway | 260—17.4 |
| 2,616,418 | 11/52 | Eberl | 128—90 |
| 2,700,461 | 1/55 | Smith | 260—47 |
| 2,751,074 | 6/56 | Ringlen et al. | 206—63.2 |
| 2,853,067 | 9/58 | Puharich | 128—90 |
| 2,864,492 | 12/58 | Lappala | 206—47 |
| 2,874,830 | 2/59 | Birmingham | 206—47 |
| 2,982,396 | 5/61 | Shibadeh | 206—47 |
| 2,982,457 | 5/61 | D'Alelio | 229—3.5 |

RICHARD A. GAUDET, *Primary Examiner.*

ROBERT E. MORGAN, JORDAN FRANKLIN,
*Examiners.*